United States Patent
Sofka et al.

(10) Patent No.: US 9,781,139 B2
(45) Date of Patent: Oct. 3, 2017

(54) IDENTIFYING MALWARE COMMUNICATIONS WITH DGA GENERATED DOMAINS BY DISCRIMINATIVE LEARNING

(71) Applicant: Cisco Technology, Inc., San Jose, CA (US)

(72) Inventors: Michal Sofka, Prague (CZ); Lukas Machlica, Martin (SK); Karel Bartos, Prague (CZ); David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 14/806,236

(22) Filed: Jul. 22, 2015

(65) Prior Publication Data

US 2017/0026390 A1  Jan. 26, 2017

(51) Int. Cl.
  *G06F 11/00* (2006.01)
  *G06F 12/14* (2006.01)
  (Continued)

(52) U.S. Cl.
  CPC ....... *H04L 63/1416* (2013.01); *G06N 99/005* (2013.01); *H04L 63/0281* (2013.01);
  (Continued)

(58) Field of Classification Search
  CPC ............. H04L 63/1416; H04L 63/1425; H04L 63/1441; G06F 21/554; G06F 2221/033
  (Continued)

(56) References Cited

U.S. PATENT DOCUMENTS

| 8,516,585 B2 | 8/2013 | Cao et al. |
| 8,631,489 B2 | 1/2014 | Antonakakis et al. |

(Continued)

OTHER PUBLICATIONS

M. Thomas and A. Mohaisen. Kindred domains: detecting and clustering botnet domains using DNS traffic. WWW Companion '14. Apr. 2014. 6 pages.

(Continued)

*Primary Examiner* — Kambiz Zand
*Assistant Examiner* — Stephen Sanders
(74) *Attorney, Agent, or Firm* — Edell, Shapiro & Finnan, LLC

(57) ABSTRACT

Techniques are presented to identify malware communication with domain generation algorithm (DGA) generated domains. Sample domain names are obtained and labeled as DGA domains, non-DGA domains or suspicious domains. A classifier is trained in a first stage based on the sample domain names. Sample proxy logs including proxy logs of DGA domains and proxy logs of non-DGA domains are obtained to train the classifier in a second stage based on the plurality of sample domain names and the plurality of sample proxy logs. Live traffic proxy logs are obtained and the classifier is tested by classifying the live traffic proxy logs as DGA proxy logs, and the classifier is forwarded to a second computing device to identify network communication of a third computing device as malware network communication with DGA domains via a network interface unit of the third computing device based on the trained and tested classifier.

20 Claims, 8 Drawing Sheets

(51) Int. Cl.
*G06F 12/16* (2006.01)
*G08B 23/00* (2006.01)
*H04L 29/06* (2006.01)
*G06N 99/00* (2010.01)
*H04L 29/12* (2006.01)

(52) U.S. Cl.
CPC ...... *H04L 63/1425* (2013.01); *H04L 61/1511* (2013.01); *H04L 61/303* (2013.01)

(58) Field of Classification Search
USPC .......................................................... 726/23
See application file for complete search history.

(56) References Cited

U.S. PATENT DOCUMENTS

| | | | |
|---|---|---|---|
| 8,631,498 B1 | 1/2014 | Hart et al. | |
| 8,661,544 B2 | 2/2014 | Yen et al. | |
| 9,516,039 B1 * | 12/2016 | Yen | H04L 63/14 |
| 2013/0191915 A1 | 7/2013 | Antonakakis et al. | |
| 2014/0075558 A1 | 3/2014 | Ward et al. | |

OTHER PUBLICATIONS

Detecting Algorithmically Generated Domain-Flux Attacks With DNS Traffic Analysis, by Yadav, S., et al. http:flconferences.sigcomm.org/imc/201 O/papers/p48.pdf, 15 pages.

H. Guerid, K. Mittig, et al. Privacy-Preserving Domain-Flux Botnet Detection in a Large Scale Network. COMSNETS 2013. Jan. 2013, 9 pages.

Columbo, E. Cerberus: Detection and characterization of automatically generated malicious domains. Thesis. Apr. 2014, 134 pages.

Yadav, et al., "Detecting Algorithmically Generated Malicious Domain Names," IMC'10, Nov. 1-3, 2010, pp. 48-61.

Schiavoni, et al., "Tracking and Characterizing Botnets Using Automatically Generated Domains," Nov. 2013, retrieved from http:l/arxiv.org/abs/1311.5612, on Feb. 27, 2015, 14 pages.

Raghuram, et al., "Unsupervised, low latency anomaly detection of algorithmically generated domain names by generative probabilistic modeling," Journal of Advanced Research (2014), Jan. 5, 2014, pp. 423-433.

Antonakakis, et al., "From Throw-Away Traffic to Bots: Detecting the Rise of DGA-Based Malware," USENIX Security Symposium 2012, Aug. 2012, 16 pages.

Weymes, "DNS anomaly detection: Defend against sophisticated malware," May 28, 2013, retrieved from http://www.net-security.org/article.php?id=1844&p=1, on Feb. 27, 2015, 3 pages.

* cited by examiner

|  | TPs | | | FPs | | | ALL | | |
|---|---|---|---|---|---|---|---|---|---|
|  | #SLDs | #URLs | #FLOWS | #SLDs | #URLs | #FLOWS | #SLDs | #URLs | #FLOWS |
| BEFORE | 60 | 1379 | 8640 | 117 | 139 | 2207 | 13290 | 82515 | 173050 |
| AFTER | 91 | 1383 | 9575 | 6 | 7 | 9 | | | |

FIG.8

IDENTIFYING MALWARE COMMUNICATIONS WITH DGA GENERATED DOMAINS BY DISCRIMINATIVE LEARNING

TECHNICAL FIELD

The present disclosure relates to network security.

BACKGROUND

Malicious botnets are one of the most potent threats to networking systems. To create malicious botnets, malware often utilizes a Domain Generation Algorithm (DGA) to generate domain names. In the phase of establishing the botnet, the malware employs the DGA generated domain name to establish a network communication with a Command & Control (C&C) server that is used by a botnet's originator (or "bot master") to control the botnet entities (bots) remotely. The use of the DGA makes it difficult to uncover the C&C server since the DGA can generate many domains, with only a (frequently changing) subset being registered and employed. Once a malicious botnet is established, the malicious botnet may deploy a platform for performing malicious activities such as denial-of-service (DoS) attacks, information gathering, distributed computing, cyber fraud, malware distribution, unsolicited marketing, etc.

BRIEF DESCRIPTION OF THE DRAWINGS

FIG. 8 is a table illustrating results before and after re-training of the classifier according to an example embodiment.

DESCRIPTION OF EXAMPLE EMBODIMENTS

Overview

Techniques are presented herein that identify malware communication with domains generated utilizing a domain generation algorithm (DGA). A plurality of sample domain names is obtained and each of the plurality of domain names is labeled as a DGA domain, a non-DGA domain or a suspicious domain. A classifier is trained in a first stage based on the plurality of sample domain names. A plurality of sample proxy logs including proxy logs of DGA domains and proxy logs of non-DGA domains are obtained to train the classifier in a second stage based on the plurality of sample domain names and the plurality of sample proxy logs. A plurality of live traffic proxy logs is obtained and the classifier is tested by classifying the plurality of live traffic proxy logs as DGA proxy logs, and the classifier is forwarded to a second computing device to identify network communication of a third computing device as malware network communication with DGA domains via a network interface unit of the third computing device based on the trained and tested classifier.

Example Embodiments

Communication with malicious domains can be detected by determining whether the domain name is generated by a DGA. Some algorithms for detecting DGA generated domain names are based on modeling a probability distribution of characters in the domain name. However, detecting communications with DGA domains merely based on modeling the probability distribution of characters in the domain name may introduce many false positives when the variability in the domain names is high and when the domain names use different languages or abbreviations.

Communication with DGA generated domains can also be detected by analyzing Domain Name System (DNS) queries and DNS statistics and/or by a combined approach of modeling the probability distribution of the characters in the domain name and analyzing the DNS statistics with regard to the potential DGA generated domain names queried from individual users of a computer network system across a large time window. Since systems that implement such combined approaches are difficult to be tuned, such approaches may result in decisions with high precision but at the cost of low recall.

Figure 1:
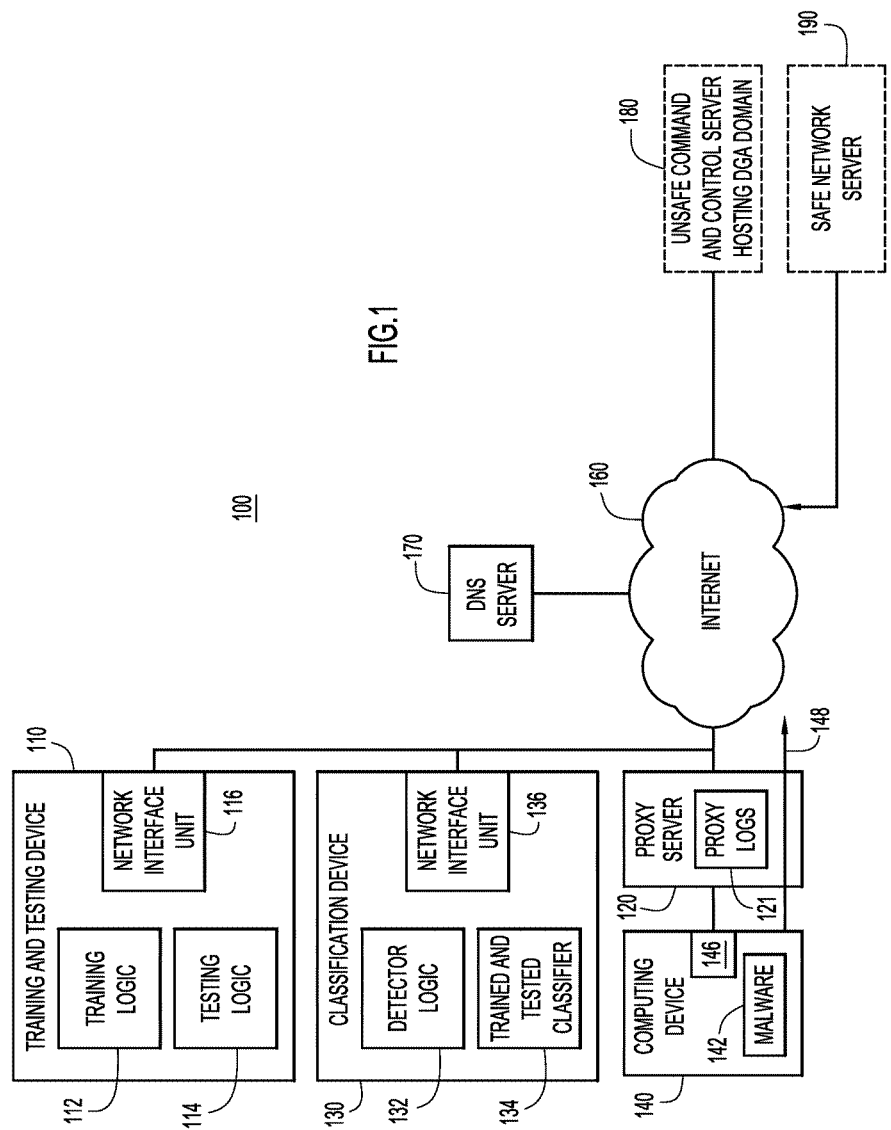
FIG. 1 is a block diagram illustrating a networking system in which training, testing and identification methods presented herein may be employed according to an example embodiment.

FIG. 1 is a block diagram illustrating a networking system 100 in which the techniques presented herein may be employed, and in which a classifier is trained and tested by a discriminative learning process. Networking system 100 includes training and testing device 110 on which training logic 112 and testing logic 114 reside and are executed. Training and testing device 110 is connected to proxy server 120 via network interface unit 116 (e.g., a network interface card). FIG. 1 further shows classification device 130 on which detector logic 132 resides and is executed utilizing trained and tested classifier 134. Classification device 130 is connected to proxy server 120 via network interface unit 136. Proxy server 120 stores proxy logs 121 of network communications to Internet 160 that are established via proxy server 120. Networking system 100 also includes computing device 140 on which malware 142 resides and is executed. Computing device 140 is connected to proxy server 120 via network interface unit 146. Proxy Server 120 connects computing device 140 to Internet 160. In FIG. 1, for simplicity, only computing device 140 is connected to Internet 160 via proxy server 120. However, computing device 140 may be, for example, part of an enterprise network (not shown), and the enterprise network may include, but is not limited to, a plurality of computing devices, servers and other network devices that may be infected by malware. In addition, several network elements may be connected to Internet 160 such as DNS server 170, unsafe C&C server 180 hosting a DGA domain and safe network server 190 that may host one or more safe non-DGA generated domains. In addition, detector logic 132 together with trained and tested classifier 134 may also reside on computing device 140.

FIG. 1 shows an attempt of computing device 140 to establish network communication 148 that is triggered by malware 142. Network connection 148 initiated by computing device 140 may be an attempt by malware 142 to communicate with unsafe C&C server 180.

As used herein, malware 142 refers to an executable file that causes a computer/processor to execute instructions, and the malware may be in a machine language, interpreted language, intermediate language, script language or any other language now known or hereinafter developed that causes a computer/processor to execute instructions.

Figure 2:
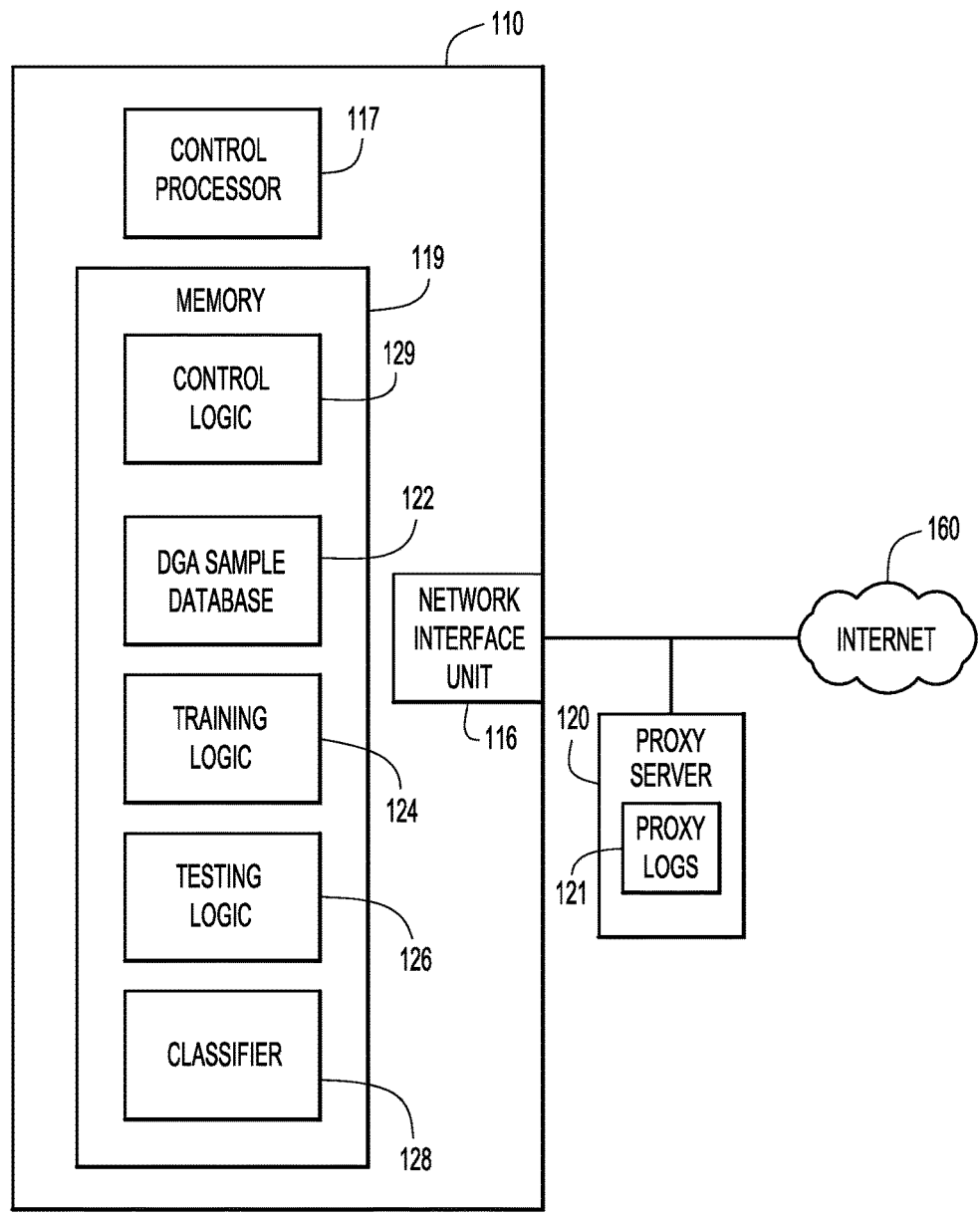
FIG. 2 is a block diagram illustrating a configuration of a training and testing device configured to perform the training and testing methods according to an example embodiment.

Reference is now made to FIG. 2. FIG. 2 is a more detailed block diagram of training and testing device 110 in FIG. 1. Training and testing device 110 includes network interface device 116, control processor 117, and memory 119.

As shown in FIG. 2, memory 119 stores DGA sample database 122, training logic 124, testing logic 126, and classifier 128. In addition, memory 119 stores control logic 129.

Control logic 129 is software that enables computing device 110 to connect to proxy server 120 via network interface device 116, as shown in FIG. 1. Control processor 117 is, for example, a microprocessor or a microcontroller that executes instructions for control logic 129, training logic 124 and testing logic 126. When the software is executed by the control processor 117, it is operable to perform the operations described herein in connection with training logic 124 and testing logic 126. Training logic 124 and testing logic 126 may be executed offline, i.e., without the training and testing device 110 being connected to proxy server 120 or to Internet 160.

The memory 119 may be read only memory (ROM), random access memory (RAM), magnetic disk storage media devices, optical storage media devices, flash memory devices, electrical, optical, or other physical/tangible memory storage devices. Thus, in general, the memory 119 may include one or more tangible (non-transitory) computer readable storage media (e.g., a memory device) encoded with software comprising computer executable instructions and when the software is executed (by the control processor 117) it is operable to perform the operations described herein. In particular, the computing device 110 performs the operations described below in connection with FIGS. 3-6 when executing the software stored in memory 119.

Figure 3:
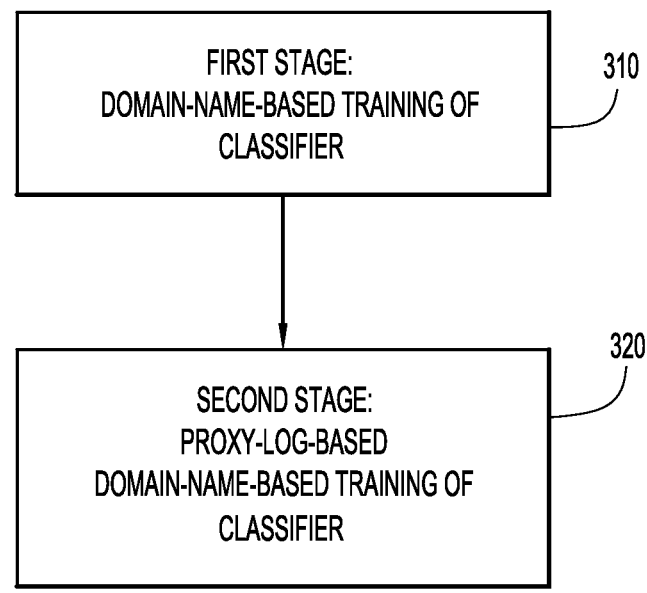
FIG. 3 is a flow chart depicting operations performed by the training and testing device to train a classifier according to an example embodiment.

Referring now to FIG. 3 (with continued reference to FIGS. 1 and 2), a flow chart is described of method 300 for discriminative machine learning and automated training of classifier 128 that is utilized after being trained and tested to identify malware network connections.

As described above, techniques for detecting malware that uses DGAs may rely only on statistical features extracted from a domain name to be analyzed. When a DGA is changed, the statistical features of the malicious domain names may also change such that techniques that are entirely based on statistical features of the domain name may fail in the process of determining whether a domain is a DGA generated domain. Method 300 represents a two-stage approach that includes automated training procedures of first and second stages that are data driven based on sample training data. However, the system is not limited to two stages. Instead, more than two training stages may be utilized. By utilizing such a multi-stage architecture, statistical data required for identifying a network communication as being malicious can be minimized.

Method 300 begins at 310 where classifier 128 is trained in a first stage based on DGA sample domain names. These DGA sample domain names are collected from various sources such as blacklists, reports, domain lists produced by new types of known DGAs, sandboxing and DNS anomaly detectors designed to analyze unusual activities in DNS requests sent to DNS server 170. The collected sample domain names are then filtered by the first stage to extract those domains that are clearly not generated by a DGA and to form a set of negative/legitimate samples. The operating point of the first classification process or first stage is thereby set for high recall, i.e., for a high probability that relevant DGA domain samples are used in the second stage of the training process. In other words, the first stage detects almost all DGA domains (high recall) even at the expense of many false positives (low precision).

At 320, classifier 128 is trained in a second stage based on the filtered sample domain names and based on sample proxy logs corresponding to the sample domain names utilized in the first stage. When training classifier 128 in the second stage, additional features extracted from the sample proxy logs are utilized to model malware behavior and to filter out false positives from the first stage.

Figure 4:
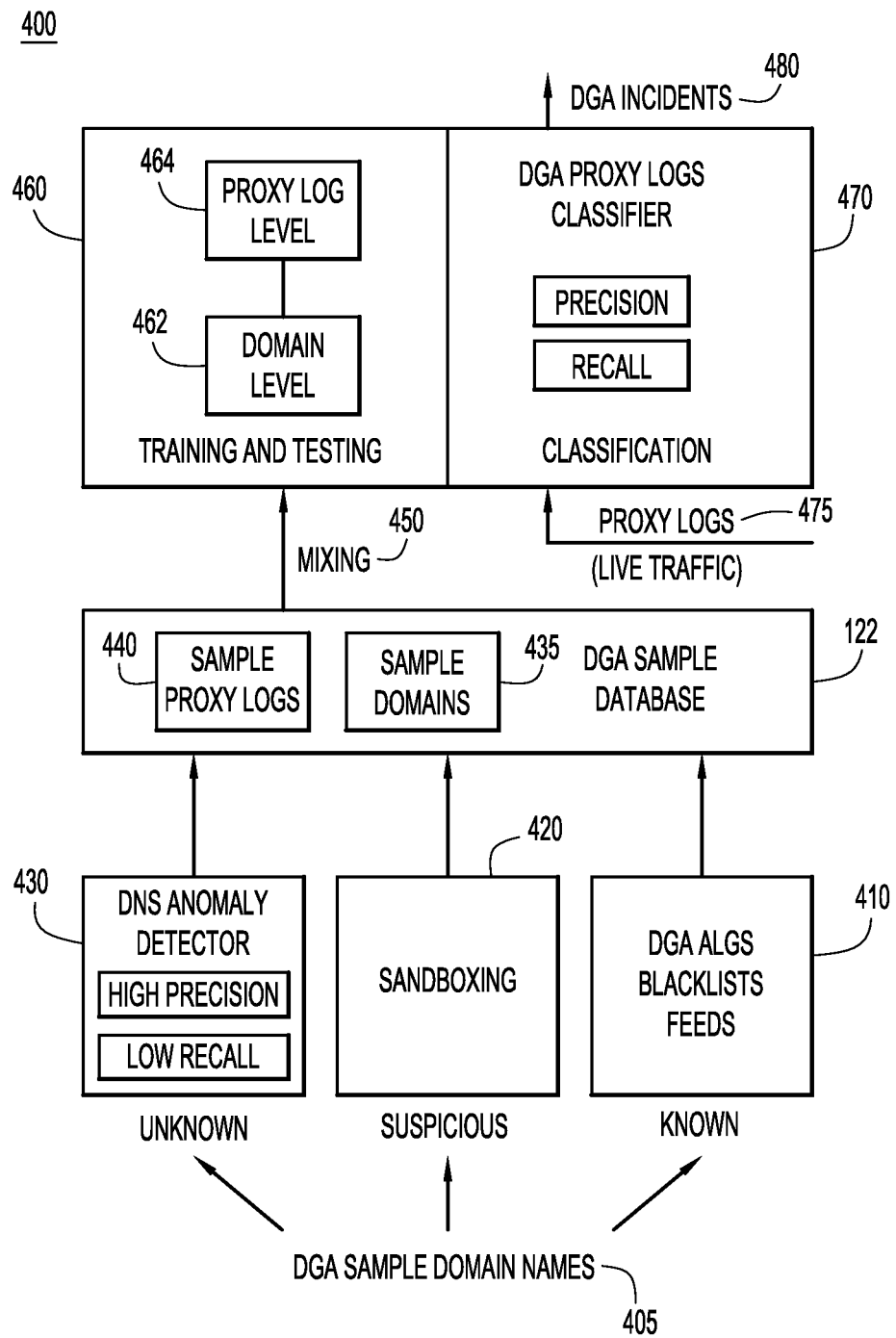
FIG. 4 is a block diagram illustrating a system workflow according to an example embodiment.

Reference is now made to FIG. 4 which further illustrates the operations of method 300 in a system workflow. The workflow begins with DGA sample domain names 405 being collected from various sources. There are three types of DGA sample domain names 405, namely known DGA sample domain names, suspicious DGA sample domain names and unknown DGA sample domain names. Sources of known DGA sample domain names 410, i.e., domain names that are known to be either DGA generated or non-DGA generated, include blacklists of known DGA generated domain names, whitelists of known non-DGA generated domain names, domain names generated by algorithms that are identified as DGAs and domain names obtained from other feeds. For example, trusted data can be obtained from service providers such as "Alexa Internet, Inc." (Alexa) that provide commercial web traffic data and global rankings. The ranking can provide an indication about the domain trust.

Suspicious DGA sample domain names are obtained from sandboxing, as shown at reference numeral 420. Sandboxing in the area of computer security is often referred to as a security mechanism for separating executed programs and for testing unverified suspicious programs that may contain computer viruses or malicious code. When an unverified suspicious program is sandboxed, attempts of the unverified suspicious program to establish a communication with a domain are recorded and the domain names are rated as being suspicious DGA sample domain names.

Unknown DGA sample domain names are obtained from DNS anomaly detectors which provide a further source for the DGA sample domain names 405. For example, DNS anomaly detector 430 may determine an anomaly value based on a ratio of a number of DNS requests in a local network and a number of internet protocol (IP) addresses of domains successfully contacted by detecting spikes in the number of DNS requests for certain IP addresses associated with domain names. DNS anomaly detector 430 is tuned for a high precision, i.e., it returns substantially more relevant results than irrelevant results at the cost of a lower recall, i.e., of a lower sensitivity.

The various sources for sample domain names may be complementary to cover all possible variants of DGAs.

The known, suspicious and unknown DGA sample domain names are stored as sample domains 435 in DGA sample database 122. In addition, corresponding sample proxy logs 440 are stored in DGA sample database 122. Sample proxy logs 440 may not be available for all sample domains 435 in DGA sample database 122. To enlarge the number of available sample proxy logs 440, sample domain names are mixed into sample proxy logs 440 obtained for other sample domains that are already in the DGA sample database. Mixing 450 is performed when the second stage is trained by iteratively replacing second level domains from classified proxy logs by classified domain names for which corresponding proxy logs are not available. For example, a first sample domain in DGA sample database 122 may be rated as a known DGA sample domain. The corresponding first sample proxy log would therefore also be rated as a known DGA sample proxy log. Both first domain and first proxy log form a first known DGA domain—DGA proxy log pair.

When a second sample domain, which is rated as a known DGA sample domain, is stored in DGA sample database 122, and when it is determined that a proxy log for the second sample domain is not available, the second classification process may duplicate the first sample proxy log, replace the second level domain name in the duplicated sample proxy log with the corresponding domain name of the second sample domain thereby transforming the duplicated sample proxy log into a second proxy log that forms a second known DGA domain—DGA proxy log pair.

Although the mixing 450 produces URLs in proxy logs to non-existing locations, the statistical properties of the sample proxy logs are preserved and can be utilized to improve training of the second classification process or second stage thereby increasing the variability of sample proxy logs 440, enlarging the training set and making the classification results more robust.

To train the classifier in the second stage, the sample proxy logs 440 are divided into true-positive and false-positive proxy logs and are utilized as positive and negative training sets.

As shown in FIG. 4, training and testing 460 of classifier 128 involves domain level training and testing 462 and proxy log level training and testing 464. Domain level training is performed by the first stage of the training logic 124. Domain level testing is performed by the first stage of testing logic 126. Proxy log level training is performed by the second stage of training logic 124 and proxy log level testing is performed by the second stage of testing logic 126.

The training 460 of classifier 128 is adaptive, i.e., the set of sample domains 435 and sample proxy logs 440 is frequently updated. By utilizing an adaptive training of both stages, classifiers or identifiers of network communications with previously undetected DGAs are produced.

Once classifier 128 on both levels (first and second stage) is trained, classifier 128 is tested by testing logic 126. During classification 470 proxy logs of live network traffic 475 are processed by both trained stages in order to identify DGA incidents 480, i.e., live traffic 475 is classified with legitimate and DGA labels.

To identify DGA incidents 480 of malware communications, several distinct features are extracted from proxy log fields of proxy logs 475 of the live traffic. Overall more than 320 features may be extracted from the proxy logs 475. The extracted features form an input feature vector.

To train classifier 128, various learning algorithms may be used. As a result of the training of classifier 128, a function is produced which indicates whether a tested proxy log is positive or negative depending on the various features extracted from the proxy log. For example, if y is a label and x is a feature vector, P(y=positive| x) and a probability density p(y| x) are obtained.

As a result, a production-ready classifier is produced that is forwarded to classification device 130, stored as trained and tested classifier 134, and used by detector logic 132 to identify malware communication with DGA domains. For example, classification device 130 may receive proxy logs 121 from proxy server 120 relating to network communication 148. Based on trained and tested classifier 134, detector logic 132 may identify network communication 148 as a communication with a DGA generated domain hosted by C&C server 180 depicted in FIG. 1. As discussed above, detector logic 132 and trained and tested classifier 134 may also reside and being executed on computing device 140 or on proxy server 120.

Some proxy log fields such as for example a number of downloaded/uploaded bytes, an http status, an elapsed time, etc. are used directly as features. Other proxy log fields are utilized to calculate respective calculated features. Non-limiting examples of calculated features are Universal Resource Locator (URL) component length, ratio of consonant to vowel changes, URL in ASCII format, maximum occurrence ratio of URL characters, maximum occurrence ratio of character type, repetitive changes of special characters, probability of component trigrams, maximal probability of two adjacent trigrams, and number of suspicious trigrams which are described in detail below.

Figure 5:
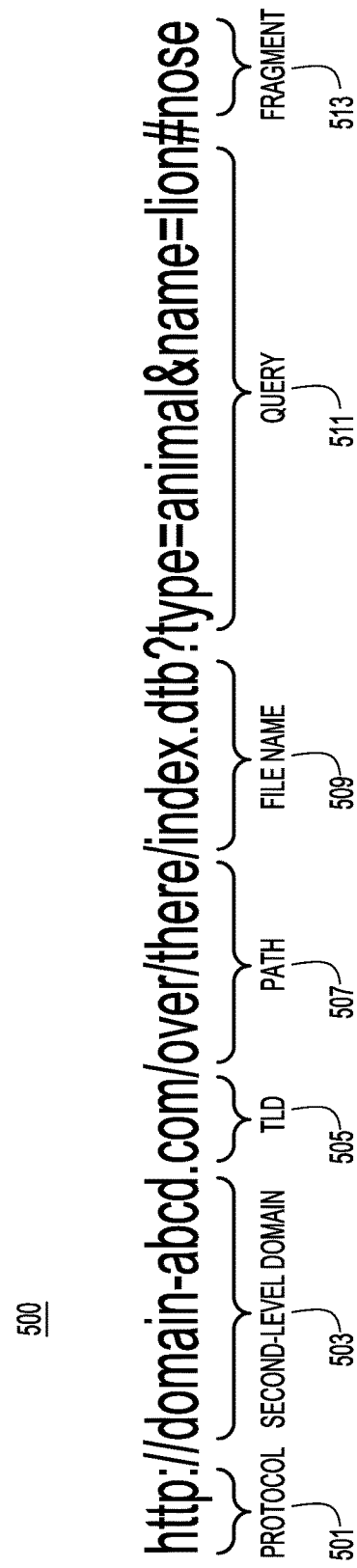
FIG. 5 is a diagram illustrating decomposition of a uniform resource locator (URL) into logical parts according to an example embodiment.

Referring now to FIG. 5, an illustration is shown of a decomposition of URL 500 into seven logical parts, namely, protocol 501, second-level domain 503, top-level domain 505, path 507, file name 509, query 511, and fragment 513.

For each part, a set of features is extracted such as a ratio of digits/lower/upper case letters, a number of special characters (e.g. '!', '?', ',', '.', ';', ':', '', '-'), a maximal length of a stream of digits/consonants/vowels, a vowel change ratio, a non-letter change ratio, features based on 3-grams of letters and others.

If the $i^{th}$ component of URL is denoted as $c_i$, the URL features are given as output values of following functions applied to the individual components.

The URL component length $l\,(c_i)$ is defined as a number of characters of an $i^{th}$ component of the URL.

The ratio of consonant to vowel changes $r_v(c_i)$ describes the frequency of changes between consonants and vowels. The ratio is specifically suitable for recognizing generated domains:

$$r_v(c_i) = \frac{\text{number of changes from consonant to vowel}}{l(c_i)}$$

The feature of URL in ASCII format is a Boolean feature. Current URL specifications allow domains in utf-8 format with a large variety of characters specific for some international domains. Trigrams made from those characters are not common even if the URL is generated by a DGA. This Boolean feature describes this case.

It has been observed that characters of some malicious URLs are distributed randomly. The maximum occurrence ratio of URL characters is useful to identify this property and is defined as a maximum number of occurrences of any character divided by the total number of characters in the URL component.

The maximum occurrence ratio of character type indicates a random distribution that can be identified not only for the individual characters, but also for types of the characters (e.g. letters, numbers, special characters, upper case letters, lower case letters, etc.).

Repetitive changes of special characters are utilized for separating types of URLs. A lot of URL addressable forms and views are long and complicated, but they typically have repetitive changes of two characters used to fill and separate individual fields of the corresponding form, for example '=' and '&'. This can be utilized to distinguish these types of URLs from other types of URLs.

Specifically for the second-level domains, the system extracts several features.

Probability of component trigrams $P_t(d)$—trigrams serve as reliable indicators whether the domain is DGA generated or not. The probability of a trigram t(A) of being part of a domain A listed in Alexa's 1 million most popular sites is defined as:

$$p_t(t(A)) = \frac{\text{number of } t(A) \text{ occurrences in Alexa}}{\text{number of all trigrams in Alexa}}.$$

Then, a rank (or upper index) is assigned to each trigram describing the trigram frequency:

$$\forall i,j \leq |A|: p_t(t^{(i)}(A)) \geq p_t(t^{(j)}(A)) \Leftrightarrow i \leq j,$$

where $p_t(t^{(i)}(A))$ denotes an $i^{th}$ most-frequent trigram from the Alexa list and $i \in \{1, \ldots, 1000\}$.

Finally, a ranking probability of a trigram t(d) being part of a legitimate domain d as is defined as follows:

$$\hat{p}_t(t(d)) = \begin{cases} 1 - (i-1) \cdot 10^{-4} & \exists i \leq 1000 : t(d) = t^{(i)}(A) \\ 0 & \text{otherwise} \end{cases}$$

The probability of domain trigrams $p_t(d)$ is defined as the average of ranking probabilities $p_t(t^{(j)}(d))$. This allows discarding highly ranked trigrams for long domains since it is more likely to observe a non-random looking trigram.

Maximal probability of two adjacent trigrams m(d) is calculated because most longer domains contain meaningful words composed of at least two frequently used adjacent trigrams. This allows removing false positives for generated domains. The probability of two adjacent trigrams is defined as follows:

$$p_t(t_j(d), t_{j+1}(d)) = \frac{\hat{p}_t(t_j(d)) + \hat{p}_t(t_{j+1}(d))}{2}.$$

Then a maximum of all values is calculated using the following formula:

$$m(d) = \max_j (p_t(t_j(d), t_{j+1}(d))).$$

The number of suspicious trigrams n(d) relates to a majority of DGA generated domains that are hard for humans to pronounce. Beside the consonant to vowel changes, this fact also increases the frequency of non-typical and rarely used trigrams. The number of suspicious trigrams n(d) is calculated based on the following formula:

$n(d) = $ number of trigrams with $\hat{p}_t(t(d)) = 0$.

In addition to the above described URL features, flow-based features such as flow duration, number of bytes transferred from client to server, number of bytes transferred from server to client, user agent, referrer, MIME-type, HTTP status, and autonomous system of server status are extracted.

Figure 6:
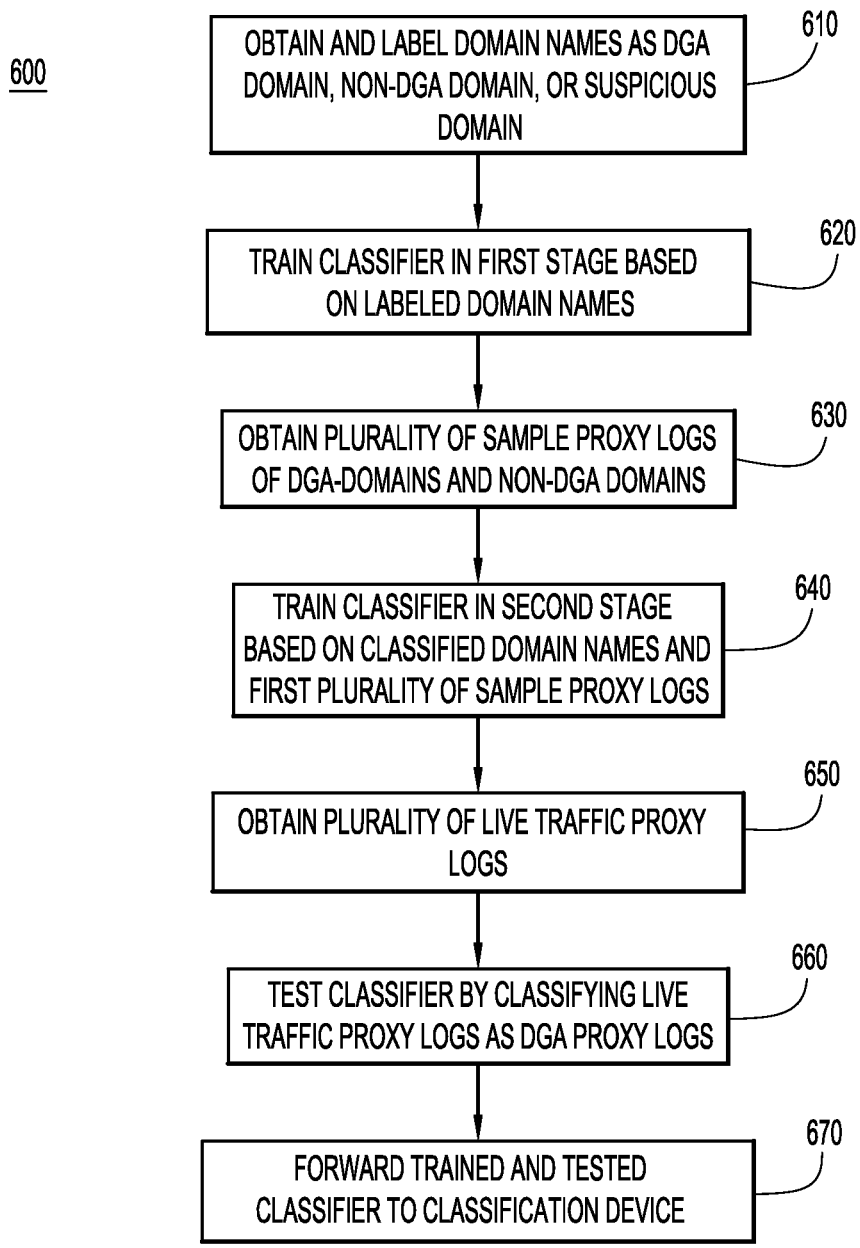
FIG. 6 is a flow chart depicting operations performed by the training and testing device to train and test the classifier by discriminative learning according to an example embodiment.

Referring now to FIG. 6, a flow chart is described of method 600 for discriminative machine learning to identify malware network connections. Reference is also made to FIG. 1 for purposes of the description of FIG. 6.

Method 600 begins at 610 where sample domains are labeled as DGA domains, Non-DGA domains or suspicious domains. DGA domains are domains that are known as being DGA generated, as described above in connection with FIG. 4. Sample domains can be obtained from proxy logs or from other sources, such as sandboxing, feeds, security reports, and anomaly detection after verifying the result.

At 620, a classifier is trained in a first stage based on sample domains that are labeled at 610. This operation is part of the domain level training 462 illustrated in FIG. 4.

At 630, a plurality of sample proxy logs of DGA domains and Non-DGA domains are obtained and stored as sample proxy logs in DGA sample database 122. Various sources to obtain sample proxy logs can be used. For example, to obtain the sample proxy logs, existing proxy logs in DGA sample database 122 can be searched as well as proxy logs 121 on proxy server 120 to determine whether proxy logs exist that correspond to the sample domains obtained at 610. At 640, the classifier is further trained in a second stage based on the domains labeled at 610 and based on the plurality of sample proxy logs obtained at 630.

At 650, a plurality of live traffic proxy logs is obtained and at 660, the trained classifier is tested by classifying the plurality of live traffic proxy logs as DGA proxy logs. This results in a trained and tested production-ready classifier which is forwarded to classification device 130.

At 670, trained and tested classifier 128 is forwarded to classification device 130 where it is stored as trained and tested classifier 134 to identify malware communication of computing device 140 with a DGA domain hosted by C&C server 180 by detector logic 132 based on proxy logs 121 obtained from proxy server 120 related to network communication 148.

Figure 7:
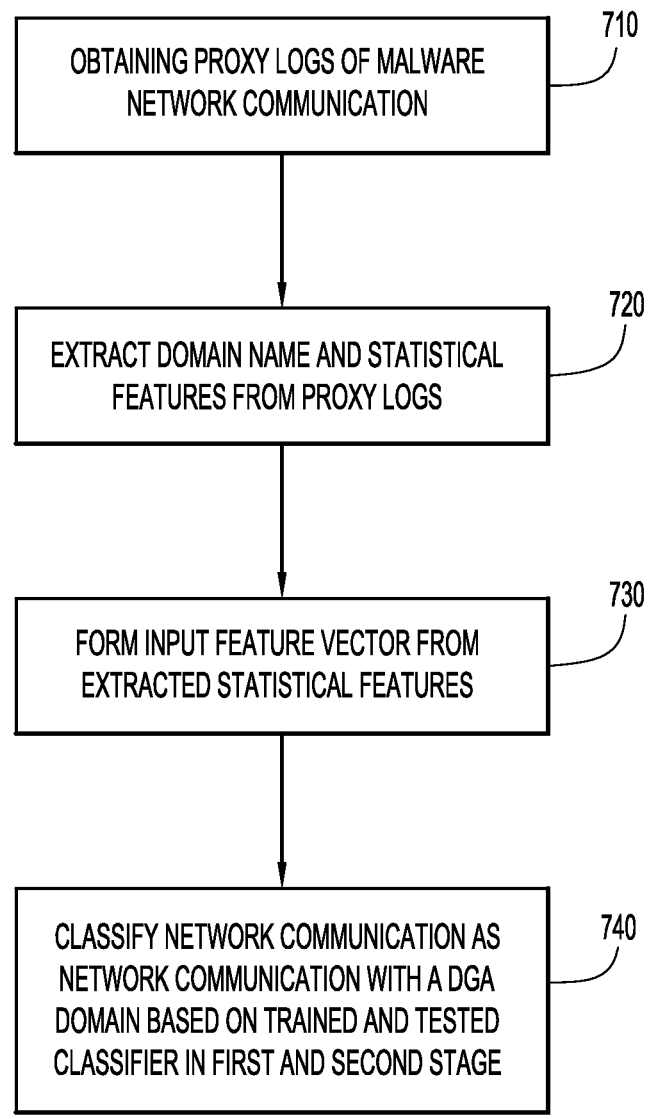
FIG. 7 is a flow chart depicting operations performed by a classification device to classify network communications based on a trained and tested classifier according to an example embodiment.

Referring now to FIG. 7 (with reference to FIGS. 1, 2 and 4), a flow chart of method 700 is now described. Method 700 involves identifying network communication 148 of computing device 140 as malware network communication with DGA domains by detector logic 132 using trained and tested classifier 134. Similar to the training and testing of classifier 128 described above with regard to FIGS. 3 and 4, detector logic 132 uses first and second stages to classify network communication 148.

Method 700 begins at 710 at which proxy logs 121 related to network communication 148 are obtained.

At 720, detector logic 132 extracts the domain name and statistical features from the proxy logs 121 obtained at 710. At 730, an input feature vector is formed from the extracted statistical features and at 740 network communication 148 is classified as a network communication with a DGA domain based on the trained and tested classifier 134 using the first and second stage of detector logic 132.

Referring now to FIG. 8, example classification results of experiments carried out using real traffic data from a variety of communication networks are shown before and after re-training of classifier 128. For this example, classifier 128 was trained in the first stage on 900,000 domains obtained from Alexa and 55,000 domains obtained from various sources such as feeds, sandboxing and blacklists. In the second stage, classifier 128 was trained on proxy logs obtained from 12 different computer networks. The set of sample domains was enlarged by mixing-in a portion (18,000) of DGA domains obtained in the first stage into sample proxy logs. Overall 39,000 of negative/legitimate samples and 28,000 of positive/malicious samples were used to train classifier 128 in the second stage.

In a next phase, additional DGA and legitimate flow samples were added to the training set of sample domains increasing its size to 40,000 negative and 35,000 positive sample domains. The training set was used to retrain classifier 128 in the second stage based on proxy logs obtained from network traffic of 27 additional computer networks not used during training. The table in FIG. 8 shows a number of true-positives (TP) 810 and false-positives (FP) 820 and a number of all classified domains 830 for detected unique second level domains (SLDs), unique URLs, and flows.

A substantial increase both in precision and recall can be observed after the re-training of classifier 128. For example, after re-training, the number of false-positive classifications of second-level domains was reduced from 117 to 6, the number of false-positive classifications of URLs was reduced from 139 to 7, and the number of false-positive classifications of flows was reduced from 2,207 to 9.

In summary, a machine learning algorithm significantly improves the detection of Command-and-Control communication caused by malware using a DGA. In particular, malware is detected that uses many different DGA variants, including those that produce previously unseen DGA domains from new DGA algorithms. This is achieved by a machine learning system with an automated training procedure. The procedure starts by collecting domain samples from various sources, such as blacklists, sandboxing reports, domain lists produced by new types of DGAs, and lists gathered by DNS anomaly detectors designed to analyze unusual activity in DNS requests. DNS anomaly detectors are tuned to operate with high precision (100%) at the cost of lower recall to ensure that the domains are indeed reliable positive samples generated by a DGA. The various data intelligence sources are sometimes complementary with the goal to cover all possible variants of DGAs.

Classification processes are organized in two stages, namely a first classification process in which domains names are analyzed alone, and a second classification process in which proxy logs are analyzed in addition to the domain names classified in the first classification process. Each stage is based on a discriminative machine learning algorithm and can be retrained independently whenever new samples are available. In addition to proxy logs, the second stage training can use additional domain names to enlarge the training set. In addition to blacklists, sandboxing, and reverse engineering, the DGA domain names can be extracted automatically from high-precision DNS anomaly detectors. This boosts the generalization and overall robustness of the machine learning algorithm and allows the detection of previously-unknown DGA domain names. Decisions are performed per proxy log in real time and no other information such as state or history is needed.

In particular, the first stage uses features extracted from the domain to filter out those domains that are clearly not generated by a DGA. The operating point of the first stage is therefore set for high recall (and lower precision). In order to train the first stage, the system uses the most trusted domains from Alexa to form the set of negative/legitimate samples. The set of positive/malicious samples is taken from various sources of DGA domains described above.

The second stage uses additional features extracted from proxy logs to model malware behavior and to filter out false positives from the first stage. The proxy logs with positive classification at the first stage are divided into true-positives and false-positives and used as positive and negative training set for the second stage classifier, respectively. The key to this process is enlarging the proxy log training set by mixing-in the domain names from the first stage and augmenting them with the other proxy log fields in the training samples. The mixing is done by iteratively replacing the second level domains from the proxy logs by the new second level domain samples. Although this produces URLs to non-existing locations, the statistical properties of the samples are preserved. This step increases the variability of the proxy log samples, enlarges the training set, and makes the resulting classifier more robust. The set of DGA domain names is frequently updated such that adaptive training of both stages produces a classifier of communication with previously-unseen DGAs.

The framework for learning classifiers of network traffic is fully data-driven and uses domain generation algorithm to obtain domain names. There are no manually tuned thresholds and the system is trained from available and stored samples.

The multi-stage architecture reduces false positives. At each stage, the classifier focuses on an easier classification problem without sacrificing recall while reducing false positives of the previous stage. For example, in the first stage, the classifier only uses domain-based features to accurately classify all domains that appear generated by a DGA. In the second stage, the classifier uses other fields of the flow or proxy log to reduce the false positives from the first stage.

The classification processes operate on each flow individually and do not need to remember any states. The classification processes do not need to compute time-dependent statistics nor observe trends. The framework uses generic features extracted from the proxy logs. These statistical features are sufficient to train reliable classification processes without supplying additional external knowledge (e.g. related to the malware files or domain registration).

The set of DGA samples can be extended for training to improve recall during classification. If the samples do not have all the attributes (e.g. if they are only domain names), they are handled at the various stages of the system, e.g., by mixing-in as discussed above.

The feature set of the system can be expanded and the whole system retrained. As such, there is no additional effort to handle new features as they are automatically used by the training procedure.

In summary, in one form, a computer-implemented method is provided comprising: at a first computing device, obtaining a plurality of sample domain names and labeling each of the plurality of sample domain names as a domain generation algorithm (DGA) domain, a non-DGA domain or a suspicious domain; training a classifier in a first stage based on the plurality of sample domain names; obtaining a plurality of sample proxy logs including proxy logs of DGA domains and proxy logs of non-DGA domains; training the classifier in a second stage based on the plurality of sample domain names and the plurality of sample proxy logs; obtaining a plurality of live traffic proxy logs; testing the classifier by classifying the plurality of live traffic proxy logs as DGA proxy logs; and forwarding the classifier to a second computing device to identify network communication of a third computing device as malware network communication with DGA domains via a network interface unit of the third computing device based on a trained and tested classifier.

In another form, an apparatus is provided comprising one or more processors; one or more memory devices in communication with the one or more processors; and a network interface unit coupled to the one or more processors, wherein the one or more processors are configured to: obtain a plurality of sample domain names and labeling each of the plurality of sample domain names as a domain generation algorithm (DGA) domain, a non-DGA domain or a suspicious domain; train a classifier in a first stage based on the plurality of sample domain names; obtain a plurality of sample proxy logs including proxy logs of DGA domains and proxy logs of non-DGA domains; train the classifier in a second stage based on the plurality of sample domain names and the plurality of sample proxy logs; obtain a plurality of live traffic proxy logs; test the classifier by classifying the plurality of live traffic proxy logs as DGA proxy logs; and forward the classifier to a computing device to identify network communication of another computing device as malware network communication with DGA domains via a network interface unit of the other computing device based on a trained and tested classifier.

In still another form, one or more computer readable non-transitory storage media are provided encoded with software comprising computer executable instructions that when executed by one or more processors, cause the one or more processors to: obtain a plurality of sample domain names and labeling each of the plurality of sample domain names as a domain generation algorithm (DGA) domain, a non-DGA domain or a suspicious domain; train a classifier in a first stage based on the plurality of sample domain names; obtain a plurality of sample proxy logs including proxy logs of DGA domains and proxy logs of non-DGA domains; train the classifier in a second stage based on the plurality of sample domain names and the plurality of sample proxy logs; obtain a plurality of live traffic proxy logs; test the classifier by classifying the plurality of live traffic proxy logs as DGA proxy logs; and forward the classifier to computing device to identify network communication of another computing device as malware network communication with DGA domains via a network interface unit of the other computing device based on a trained and tested classifier.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

The invention claimed is:

1. A computer-implemented method comprising:
at a first computing device, obtaining a plurality of sample domain names and labeling each of the plurality of sample domain names as a domain generation algorithm (DGA) domain, a non-DGA domain or a suspicious domain;
training a classifier in a first stage based on the plurality of sample domain names without a proxy log;
obtaining a plurality of sample proxy logs including proxy logs of DGA domains and proxy logs of non-DGA domains;
training the classifier in a second stage based on the plurality of sample domain names and the plurality of sample proxy logs;
obtaining a plurality of live traffic proxy logs;
testing the classifier by classifying the plurality of live traffic proxy logs as DGA proxy logs; and
using the trained and tested classifier to identify network communication of a second computing device as malware network communication with DGA domains via a network interface unit of the second computing device.

2. The method of claim 1, wherein training the classifier in the first stage comprises:
obtaining DGA domains and non-DGA domains from whitelists and blacklists;
obtaining suspicious domains from a domain contacted by an isolated malicious program; and
obtaining unknown DGA domains from output of a Domain Name System anomaly detection process.

3. The method of claim 1, wherein training the classifier in the second stage comprises:
generating an artificial proxy log of a DGA domain by selecting a proxy log of a DGA domain comprising a first domain name from the plurality of sample proxy logs and replacing the first domain name with a second domain name classified as a DGA domain name; and
adding the artificial proxy log to the plurality of sample proxy logs.

4. The method of claim 3, further comprising:
storing statistical training data calculated from the plurality of sample proxy logs and the corresponding domain names in a sample database, wherein the statistical data includes features calculated based on the domain names and flow based features; and
training the classifier based on the statistical training data.

5. The method of claim 4, wherein testing the trained classifier comprises:
extracting statistical features from the live traffic proxy logs;
forming a first input feature vector from the statistical features extracted from the live traffic proxy logs; and
generating a test result by applying the trained classifier to the first input feature vector.

6. The method of claim 4, wherein each of the plurality of sample proxy logs comprises a domain name in the form of a uniform resource locator (URL); and
wherein storing the statistical training data comprises:
parsing the URL into logical parts; and
calculating statistics for each logical part of the URL.

7. The method of claim 4, further comprising:
obtaining proxy logs of the malware network communication;
extracting statistical features from the proxy logs of the malware network communication;
forming a second input feature vector from the statistical features extracted from the proxy logs of the malware network communication; and
identifying the network communication as the malware network communication with DGA domains by applying the trained and tested classifier to the second input feature vector.

8. An apparatus comprising:
one or more processors;
one or more memory devices in communication with the one or more processors; and
a network interface unit coupled to the one or more processors,
wherein the one or more processors are configured to:
obtain a plurality of sample domain names and labeling each of the plurality of sample domain names as a domain generation algorithm (DGA) domain, a non-DGA domain or a suspicious domain;

train a classifier in a first stage based on the plurality of sample domain names without a proxy log;
obtain a plurality of sample proxy logs including proxy logs of DGA domains and proxy logs of non-DGA domains;
train the classifier in a second stage based on the plurality of sample domain names and the plurality of sample proxy logs;
obtain a plurality of live traffic proxy logs;
test the classifier by classifying the plurality of live traffic proxy logs as DGA proxy logs; and
use the trained and tested classifier to identify network communication of another computing device as malware network communication with DGA domains via a network interface unit of the other computing device.

9. The apparatus of claim 8, wherein the one or more processors are configured to train the classifier in the first stage by:
obtaining DGA domains and non-DGA domains from whitelists and blacklists;
obtaining suspicious domains from a domain contacted by an isolated malicious program; and
obtaining unknown DGA domains from output of a Domain Name System anomaly detection process.

10. The apparatus of claim 8, wherein the one or more processors are configured to train the classifier in the second stage by:
generating an artificial proxy log of a DGA domain by selecting a proxy log of a DGA domain comprising a first domain name from the plurality of sample proxy logs and replacing the first domain name with a second domain name classified as a DGA domain name; and
adding the artificial proxy log to the plurality of sample proxy logs.

11. The apparatus of claim 10, wherein the one or more processors are configured to:
store statistical training data calculated from the plurality of sample proxy logs and the corresponding domain names in a sample database, wherein the statistical data includes features calculated based on the domain names and flow based features; and
train the classifier based on the statistical training data.

12. The apparatus of claim 10, wherein the one or more processors are configured to test the trained classifier by:
extracting statistical features from the live traffic proxy logs;
forming a first input feature vector from the statistical features extracted from the live traffic proxy logs; and
generating a test result by applying the trained classifier to the first input feature vector.

13. The apparatus of claim 10, wherein each of the plurality of sample proxy logs comprises a domain name in the form of a uniform resource locator (URL), and wherein the one or more processors are configured to store the statistical training data by:
parsing the URL into logical parts; and
calculating statistics for each logical part of the URL.

14. The apparatus of claim 10, wherein the one or more processors are configured to:
obtain proxy logs of the malware network communication;
extract statistical features from the proxy logs of the malware network communication;
form a second input feature vector from the statistical features extracted from the proxy logs of the malware network communication; and
identify the network communication as the malware network communication with DGA domains by applying the trained and tested classifier to the second input feature vector.

15. One or more computer readable non-transitory storage media encoded with software comprising computer executable instructions that when executed by one or more processors, cause the one or more processors to:
obtain a plurality of sample domain names and labeling each of the plurality of sample domain names as a domain generation algorithm (DGA) domain, a non-DGA domain or a suspicious domain;
train a classifier in a first stage based on the plurality of sample domain names without a proxy log;
obtain a plurality of sample proxy logs including proxy logs of DGA domains and proxy logs of non-DGA domains;
train the classifier in a second stage based on the plurality of sample domain names and the plurality of sample proxy logs;
obtain a plurality of live traffic proxy logs;
test the classifier by classifying the plurality of live traffic proxy logs as DGA proxy logs; and
use the trained and tested classifier to identify network communication of another computing device as malware network communication with DGA domains via a network interface unit of the other computing device.

16. The computer readable non-transitory storage media of claim 15, wherein the executable instructions further cause the one or more processors to train the classifier in the first stage by:
obtaining DGA domains and non-DGA domains from whitelists and blacklists;
obtaining suspicious domains from a domain contacted by an isolated malicious program; and
obtaining unknown DGA domains from output of a Domain Name System anomaly detection process.

17. The apparatus of claim 15, wherein the executable instructions further cause the one or more processors to train the classifier in the second stage by:
generating an artificial proxy log of a DGA domain by selecting a proxy log of a DGA domain comprising a first domain name from the plurality of sample proxy logs and replacing the first domain name with a second domain name classified as a DGA domain name; and
adding the artificial proxy log to the plurality of sample proxy logs.

18. The computer readable non-transitory storage media of claim 17, wherein the executable instructions further cause the one or more processors to:
store statistical training data calculated from the plurality of sample proxy logs and the corresponding domain names in a sample database; wherein the statistical data includes features calculated based on the domain names and flow based features; and
train the classifier based on the statistical training data.

19. The computer readable non-transitory storage media of claim 17, wherein the executable instructions further cause the one or more processors to test the trained classifier by:
extracting statistical features from the live traffic proxy logs;
forming a first input feature vector from the statistical features extracted from the live traffic proxy logs; and
generating a test result by applying the trained classifier to the first input feature vector.

20. The computer readable non-transitory storage media of claim 17, wherein each of the plurality of sample proxy logs comprises a domain name in the form of a uniform resource locator (URL), and wherein the executable instructions further cause the one or more processors to:
- store the statistical training data by parsing the URL into logical parts and calculating statistics for each logical part of the URL
- obtain proxy logs of the malware network communication;
- extract statistical features from the proxy logs of the malware network communication;
- form a second input feature vector from the statistical features extracted from the proxy logs of the malware network communication; and
- identify the network communication as the malware network communication with DGA domains by applying the trained and tested classifier to the second input feature vector.

\* \* \* \* \*